United States Patent [19]
Bartok et al.

[11] Patent Number: 5,207,013
[45] Date of Patent: May 4, 1993

[54] FREE FLOATING FISHING TOOL

[76] Inventors: David Bartok, 2417 1st St.; Kent Brewer, R.R. 1, Box 119B, both of Eldorado, Ill. 62930

[21] Appl. No.: 872,353

[22] Filed: Apr. 23, 1992

[51] Int. Cl.⁵ .............................................. A01K 69/00
[52] U.S. Cl. .......................................... 43/4; 43/43.1; 43/4.5
[58] Field of Search ............... 43/43.1, 44.87, 44.9, 43/27.4, 57.3, 4.5; D22/146

[56] References Cited

U.S. PATENT DOCUMENTS

| | | | |
|---|---|---|---|
| 1,804,084 | 5/1931 | Blake | 43/43.1 |
| 2,103,222 | 12/1937 | Nelson | 43/49 |
| 2,491,182 | 12/1949 | Jaske | 43/49 |
| 2,766,548 | 10/1956 | Willardsen | 43/43.13 |
| 2,811,805 | 11/1957 | McGee | 43/43.1 |
| 3,216,146 | 11/1965 | Johnson et al. | 43/27.4 |
| 3,491,477 | 1/1970 | Karras et al. | 43/44.84 |
| 4,090,318 | 5/1978 | Webster | 43/43.14 |
| 4,884,355 | 12/1989 | Neihoff et al. | 43/17 |
| 5,048,219 | 9/1991 | Georgescu | 43/44.9 |

Primary Examiner—Richard K. Seidel
Assistant Examiner—Jeanne M. Elpel
Attorney, Agent, or Firm—Richard C. Litman

[57] ABSTRACT

An apparatus for use in fishing in which a fisherman can toss the apparatus out of a boat and then leave the area so that there is no disturbance in the area of the apparatus to keep fish from being attracted to the bait attached to a hook. The apparatus consists of a container which may be hollow, filled with air and of sufficient size to float on the water, to provide enough resistance to set the hook in the mouth of the fish and to provide enough drag to tire the fish after the hook has been set in the mouth of the fish. Attached to a smaller end of the container is a lid to prevent water from entering the container. Also attached to the smaller end is a fishing line to which is attached a swivel, a sinker, and a hook to which bait may be attached.

4 Claims, 2 Drawing Sheets

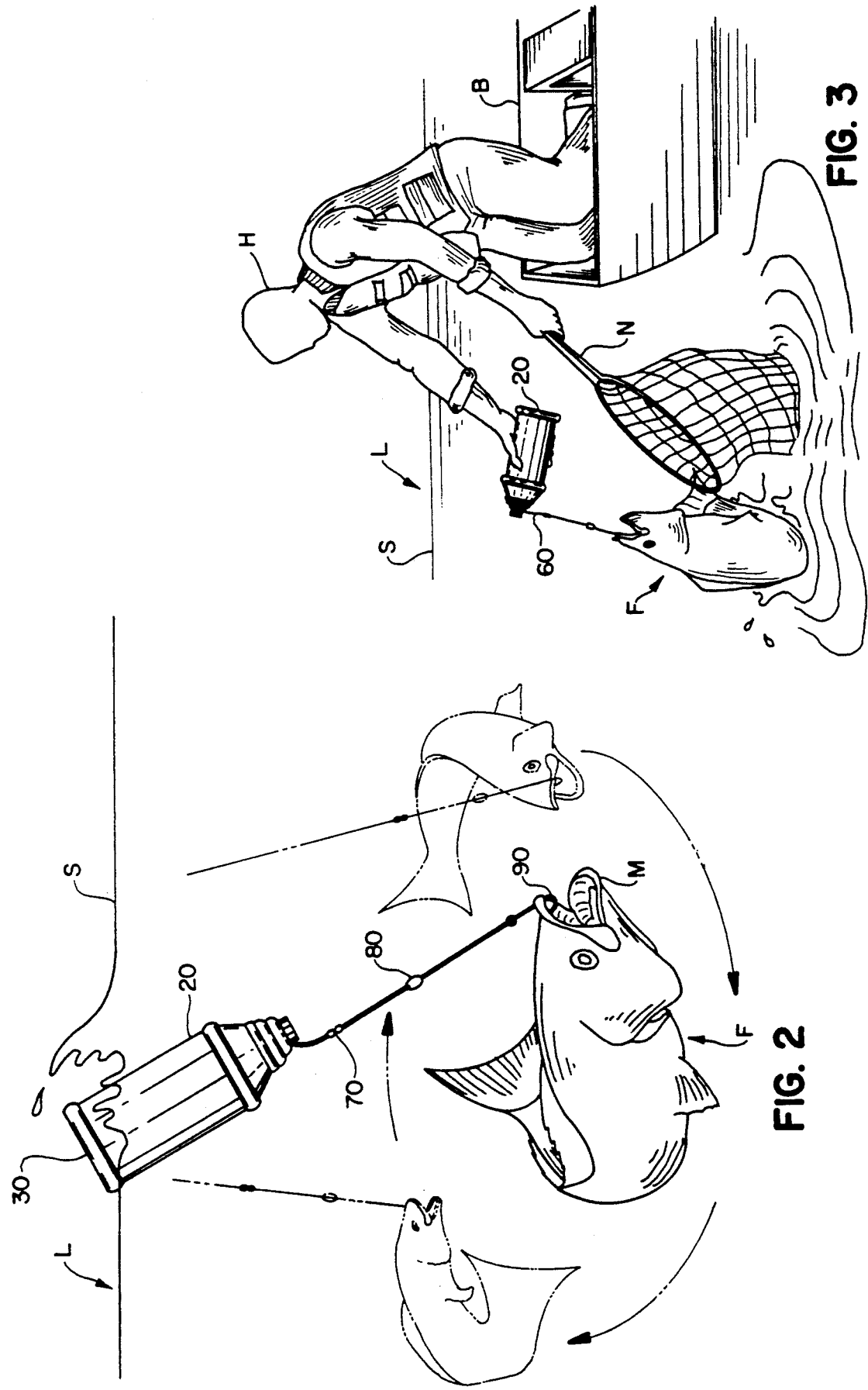

FREE FLOATING FISHING TOOL

BACKGROUND OF THE INVENTION

1. Field of the Invention

The present invention relates generally to the field of fishing and, more particularly, to a free floating fishing device and a method of use of the free floating fishing device.

2. Description of the Prior Art

Heretofore many types of floats and sinkers have been utilized in connection with fishing equipment, the use of which is well known. It has been found however, that the known equipment is not satisfactory for covering a large area while the fisherman is away from the area.

U.S. Pat. No. 3,491,477 issued Jan. 27, 1970 to Joseph D. Karras discloses a device for attaching fishing tackle to a fishing line.

U.S. Pat. No. 2,811,805 issued Nov. 5, 1957 to Curtis B. McGee discloses a float for supporting a fishing line in a body of water where the float is attached to a line which leads to a fishing pole.

U.S. Pat. No. 2,766,548 issued Oct. 16, 1956 to Anthony C. Willardsen discloses a floating sinker that is attached to a fishing line which leads to a fishing pole.

U.S. Pat. No. 2,491,182 issued Dec. 13, 1949 to Theodore A. Jaske discloses a combined fish line float, rod tip and hook protector which can be attached to a fishing line attached to a fishing pole.

U.S. Pat. No. 2,103,222 issued Dec. 21, 1937 to Moses F. Nelson discloses a fishing float for use in still fishing that is attached to a fishing line attached to a fishing pole.

None of the above inventions and patents, taken either singly or in combination, is seen to describe the instant invention as claimed.

SUMMARY OF THE INVENTION

The present invention is intended to overcome the problems of the prior art fishing devices by having a free floating fishing device that is not attached to anything else.

Accordingly, it is a principal object of the invention to provide a free floating fishing device that a fisherman can leave unattended for an extended period of time without attaching it to anything.

It is another object of the invention to provide enough resistance for the free floating fishing device to set a hook in the mouth of a fish.

It is a further object of the invention to provide a method of use of the free floating fishing device.

Still another object of the invention is to provide a free floating fishing device that has all of the necessary equipment for fishing attached to an elongated body of buoyant material of sufficient buoyancy for purposes of setting a hook in the mouth of the fish.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is an environmental perspective view showing the fish being hooked and tired out by the fishing tool.

FIG. 3 is an environmental perspective view showing the fishing tool and the hooked fish being picked up by the fisherman.

Similar reference characters denote corresponding features consistently throughout the attached drawings.

DETAILED DESCRIPTION OF THE PREFERRED EMBODIMENT

Figure 1:
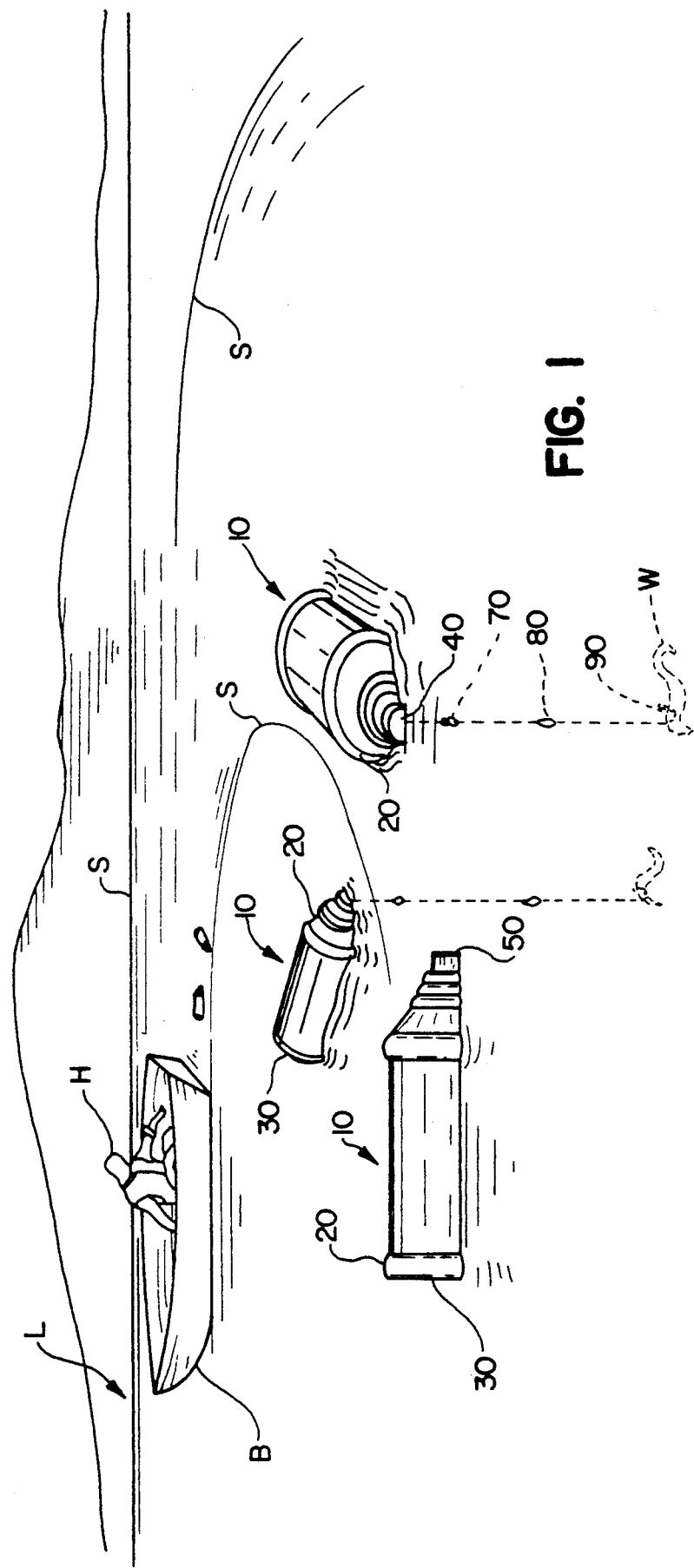
FIG. 1 is an environmental perspective view showing the dropping of the fishing tool.

The present invention is a free floating fishing device and a method for using the same. With particular reference to FIGS. 1 and 2, the free floating fishing device 10 has a container 20 with an elongated body made of buoyant material possibly hollow preferably circular in cross-section with a larger diameter end 30 and a smaller diameter end 40 and preferably a volume of sixteen ounces or greater. The container 20 is filled with air and has a closed end (larger diameter end) 30 and an open end (smaller diameter end) 40. A lid 50 is attached to the open end 40 of the container 20 to prevent water from entering the container 20 when the free floating fishing device 10 is in use. A fishing line 60 is attached to the open end 40 of the container 20 and allowed to dangle therefrom. A spaced distance along the fishing line 60 from the open end 40 of the container 20 is attached a swivel 70 which can possibly be a brass bubble swivel. Another spaced distance along the fishing line 60 away from the open end 40 of the container 20 and a spaced distance from the swivel 70 is attached a sinker 80 which may be in the form of a lead egg sinker. At the opposite end of the fishing line 60 from the open end 40 of the container 20 is attached a hook 90 which is of a special design which makes it easier for the hook 90 to become set in the mouth M of a fish F.

Referring now to FIG. 1, a fisherman H in a boat B tosses out the free floating fishing device 10 into a body of water L, such as a lake, with some bait W, such as a worm, attached to the hook 90 at the beginning of the time that the fisherman desires for the free floating fishing device 10 to be in use to catch fish F. Then, the fisherman H moves the boat B away from the area so that there is no disturbance near the free floating fishing device 10. After a while (turning now to FIG. 2), a fish F sees the bait W and makes a move to try to eat the bait W, at which time, the fish F bites the bait W and the hook 90, causing the free floating fishing device 10 to be drawn below the surface S of the body of water L. Since the container 20 is buoyant, it provides resistance against the pull that the fish F exerts in pulling the free floating fishing device 10 below the surface S by tending to bob towards and above the surface S, thereby setting the hook 90 in the mouth M of the fish F. The fish F then runs with the free floating fishing device 10, which exerts drag on the fishing line 60 thereby tiring the fish F until the fish F out of exhaustion rests in the same spot.

Referring now to FIG. 3, the fisherman H comes back to the area after a certain amount of time and locates the free floating fishing devices 10 that he earlier tossed into the body of water L by looking for the containers 20 sitting partially on the surface S. The fisherman H then moves the boat B to the vicinity of each free floating fishing device 10 to pick up the free floating fishing device 10 and any fish F attached and uses a net N to facilitate in the capture of the fish F.

It is to be understood that the present invention is not limited to the sole embodiment described above, but encompasses any and all embodiments within the scope of the following claims.

We claim:

1. A free floating fishing device comprising an elongated hollow cylindrical body of buoyant material with a closed end and an open end opposite the closed end, said closed end having a larger diameter than said open end;

means for closing said open end;
    a fishing line attached to said open end;
    a swivel attached to said fishing line near said open end;
    a sinker attached to said fishing line at a point further from said open end than said swivel; and
    a hook attached to said fishing line at an end of said fishing line opposite said open end of said elongated hollow cylindrical body of buoyant material;
    said elongated hollow cylindrical body of buoyant material being filled with a sufficient volume of air to continue floating after a fish has been hooked.

2. A free floating fishing device according to claim 1, wherein:

said swivel is a brass bubble swivel; and
    said sinker is a lead egg sinker.

3. A method of fishing with a free floating fishing device comprising the steps of:

providing a free floating fishing device including an elongated hollow cylindrical body of buoyant material filled with air and having a closed end, an open end of smaller diameter than the closed end, means for closing said open end, a fishing line attached to the open end, a swivel attached to said fishing line near said open end, a sinker attached to said fishing line, and a hook attached to a free end of said line;
    placing bait on said hook;
    tossing the free floating fishing device out of a boat and into a body of water;
    moving said boat a spaced distance from said free floating fishing device;
    waiting a sufficient time to enable said free floating fishing device to hook a fish;
    returning said boat to said free floating fishing device;
    picking up said free floating fishing device and said fish with the aid of a net; and
    unhooking said fish from said hook.

4. A method of using a free floating fishing device according to claim 3, wherein the step of waiting a sufficient time to enable said free floating fishing device to hook a fish further comprises the steps of:

said fish grabbing said bait and said hook thereby pulling said elongated hollow cylindrical body of buoyant material below a surface of said body of water whereby a drag force caused by a resistance to said pulling causes said hook to become set in a mouth of said fish;
    said fish becoming tired by pulling said free floating fishing device around while swimming; and
    said elongated hollow cylindrical body of buoyant material indicating a location of said fish until said free floating fishing device is retrieved.

* * * * *